United States Patent
Rebstock et al.

(10) Patent No.: US 11,568,438 B1
(45) Date of Patent: Jan. 31, 2023

(54) SYSTEM FOR GENERATING A DIGITAL PROMOTION BASED UPON COMPLETED TASKS WITHIN A GROUP CHAT AND RELATED METHODS

(71) Applicant: Inmar Clearing, Inc., Winston-Salem, NC (US)

(72) Inventors: Chris Rebstock, Round Rock, TX (US); Dalton Goguen, Ashby, MA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 4 days.

(21) Appl. No.: 17/107,106

(22) Filed: Nov. 30, 2020

(51) Int. Cl.
  *G06Q 30/02* (2012.01)
  *H04L 51/04* (2022.01)
  *H04W 4/02* (2018.01)
  *H04L 51/046* (2022.01)
  *H04W 4/029* (2018.01)

(52) U.S. Cl.
  CPC ..... *G06Q 30/0234* (2013.01); *G06Q 30/0236* (2013.01); *G06Q 30/0239* (2013.01); *H04L 51/046* (2013.01); *H04W 4/029* (2018.02)

(58) Field of Classification Search
  CPC ..... G06Q 50/01; G06Q 30/0209; H04W 4/14; G06F 3/147; H04L 12/1818
  See application file for complete search history.

(56) References Cited

U.S. PATENT DOCUMENTS

| | | | | |
|---|---|---|---|---|
| 6,212,548 B1* | 4/2001 | DeSimone | .......... | H04L 12/1813 719/329 |
| 8,630,961 B2* | 1/2014 | Beilby | .................. | G06N 3/004 706/11 |
| 9,406,201 B2 | 8/2016 | Englman et al. | | |
| 9,524,502 B2 | 12/2016 | Rajan et al. | | |
| 2013/0262203 A1* | 10/2013 | Frederick | .......... | G06Q 30/0209 705/14.58 |
| 2014/0038649 A1* | 2/2014 | Kirschner | ............... | H04W 4/14 455/466 |
| 2016/0313906 A1* | 10/2016 | Kilchenko | .......... | G06Q 30/0269 |
| 2017/0213406 A1* | 7/2017 | Fares | ................. | G07C 9/00896 |
| 2018/0006835 A1* | 1/2018 | Li | ........................ | H04L 12/1818 |
| 2018/0199156 A1* | 7/2018 | Gandhi | ................... | H04W 4/06 |
| 2018/0293603 A1* | 10/2018 | Glazier | .................. | G06Q 50/01 |
| 2018/0359292 A1* | 12/2018 | Chen | ..................... | H04L 65/403 |

* cited by examiner

*Primary Examiner* — Saba Dagnew
(74) *Attorney, Agent, or Firm* — Allen, Dyer, Doppelt + Gilchrist, P.A.

(57) ABSTRACT

A system for generating a digital promotion may include mobile wireless communications devices each associated with a respective user, and a promotion generation server. The promotion generation server may obtain a group chat code from a given mobile wireless communications device for starting a group chat with other users, and obtain a unique identifier from the given mobile wireless communications device and add a respective mobile wireless communications device to the group chat based upon the unique identifier. The promotion generation server may also generate tasks for the users to complete via the respective mobile wireless communications devices for display within the group chat, and determine when each of the tasks has been completed based upon input from at least one of the mobile wireless communications devices, and when so generate and communicate the digital promotion to the mobile wireless communications devices for display within the group chat.

24 Claims, 4 Drawing Sheets

SYSTEM FOR GENERATING A DIGITAL PROMOTION BASED UPON COMPLETED TASKS WITHIN A GROUP CHAT AND RELATED METHODS

TECHNICAL FIELD

The present invention relates to the field of electronics, and more particularly, to the processing of digital promotions and related methods.

BACKGROUND

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

An online chat may refer to any kind of communication over the Internet that offers a real or near real-time transmission of text and/or multimedia messages among chat participants. Chat messages are generally short in order to enable other participants to respond quickly. An online chat may include more than two participants, for example, and may be called a group chat.

SUMMARY

A system for generating a digital promotion may include a plurality of mobile wireless communications devices each associated with a respective user. The system may also include a promotion generation server configured to obtain a group chat code from a given one of the plurality of mobile wireless communications devices for starting a group chat with other users of respective ones of the plurality of mobile wireless communications devices. The promotion generation server may also be configured to obtain at least one unique identifier from the given mobile wireless communications device and add a respective at least one other mobile wireless communications device from among the plurality thereof to the group chat based upon the at least one unique identifier.

The promotion generation server may further be configured to generate a plurality of tasks for the plurality of users to complete via the respective mobile wireless communications devices for display within the group chat, and determine when each of the plurality of tasks has been completed based upon input from at least one of the plurality of mobile wireless communications devices, and when so generate and communicate the digital promotion to the plurality of mobile wireless communications devices for display within the group chat.

The plurality of tasks may include one of the plurality of users checking-in at a desired geographic location. The promotion generation server may be configured to obtain an actual geographic location from at least one of the plurality of mobile wireless communications devices and determine whether the user has checked-in at the geographic location based upon a match between the desired and actual geographic locations, for example.

The plurality of tasks may include making a purchase at a desired purchase location. The promotion generation server may be configured to obtain an image of a receipt from at least one of the mobile wireless communications devices, and determine whether the user has made the purchase from the desired purchase location based upon the image of the receipt, for example.

The promotion generation server may be configured to perform an optical character recognition of the image of the receipt, and determine whether the user has made the purchase based upon the optical character recognition, for example. The promotion generation server may be configured to obtain the image of the receipt via the group chat. The digital promotion may be redeemable at the desired purchase location, for example.

The promotion generation server may be configured to generate the plurality of tasks for each respective user to complete via the respective mobile wireless communications device, and determine when each of the respective users has completed the plurality of tasks based upon input from respective ones of the plurality of mobile wireless communications devices. The digital promotion may be redeemable by each of the respective users within the group chat.

The group chat may include a short message service (SMS) group chat, for example. The chat code may include an SMS short code, for example A method aspect is directed to a method of generating a digital promotion. The method may include using a promotion generation server to obtain a group chat code from a given one of a plurality of mobile wireless communications devices each associated with a respective user for starting a group chat with other users of respective ones of the plurality of mobile wireless communications devices. The method may also include using the promotion generation server to obtain at least one unique identifier from the given mobile wireless communications device and add a respective at least one other mobile wireless communications device from among the plurality thereof to the group chat based upon the at least one unique identifier, and generate a plurality of tasks for the plurality of users to complete via the respective mobile wireless communications devices for display within the group chat.

The method may further include using the promotion generation server to determine when each of the plurality of tasks has been completed based upon input from at least one of the plurality of mobile wireless communications devices, and when so generate and communicate the digital promotion to the plurality of mobile wireless communications devices for display within the group chat.

A computer readable medium aspect is directed to a non-transitory computer readable medium for generating a digital promotion. The non-transitory computer readable medium has computer executable instructions that when executed by a processor cause the processor to perform operations. The operations may include obtaining a group chat code from a given one of a plurality of mobile wireless communications devices each associated with a respective user for starting a group chat with other users of respective ones of the plurality of mobile wireless communications devices. The operations may also include obtaining at least one unique identifier from the given mobile wireless communications device and add a respective at least one other mobile wireless communications device from among the plurality thereof to the group chat based upon the at least one unique identifier.

The operations may further include generating a plurality of tasks for the plurality of users to complete via the respective mobile wireless communications devices for display within the group chat. The operations may also include determining when each of the plurality of tasks has been completed based upon input from at least one of the plurality of mobile wireless communications devices, and when so generating and communicating the digital promotion to the plurality of mobile wireless communications devices for display within the group chat.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
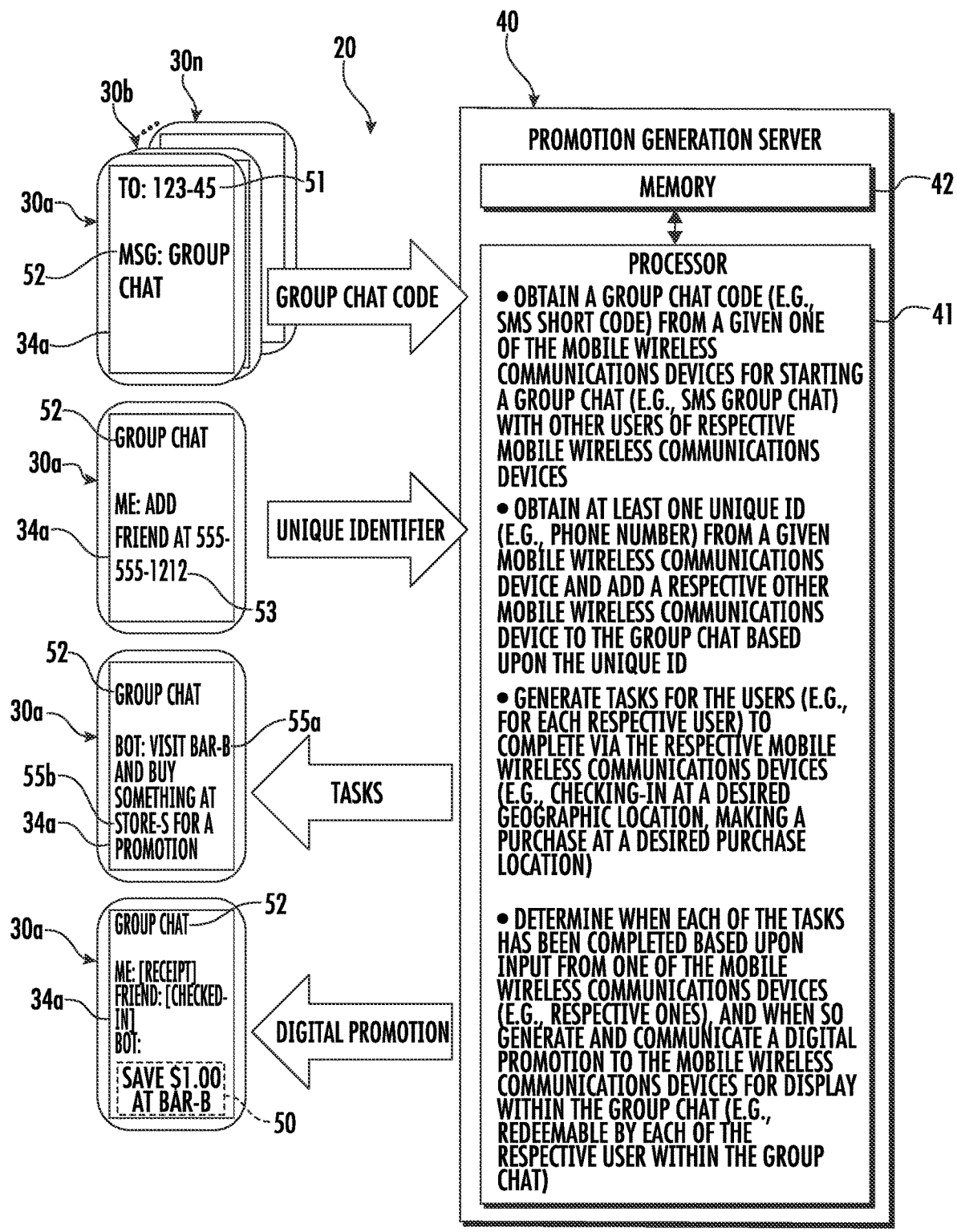
FIG. 1 is a schematic diagram of a system for generating a digital promotion in accordance with an embodiment.
Figure 2:
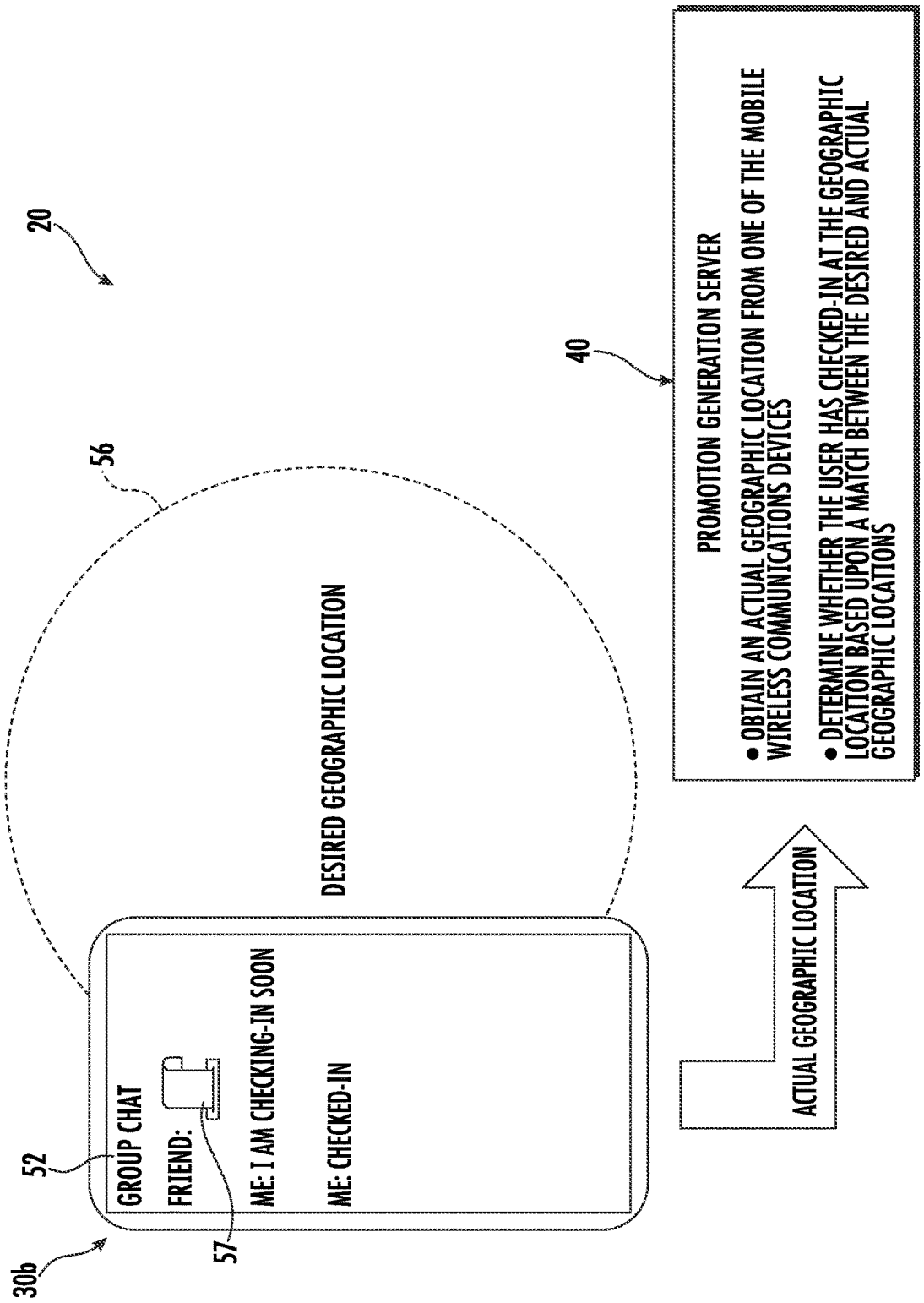
FIG. 2 is another schematic diagram of a system for generating a digital promotion in accordance with an embodiment.
Figure 3:
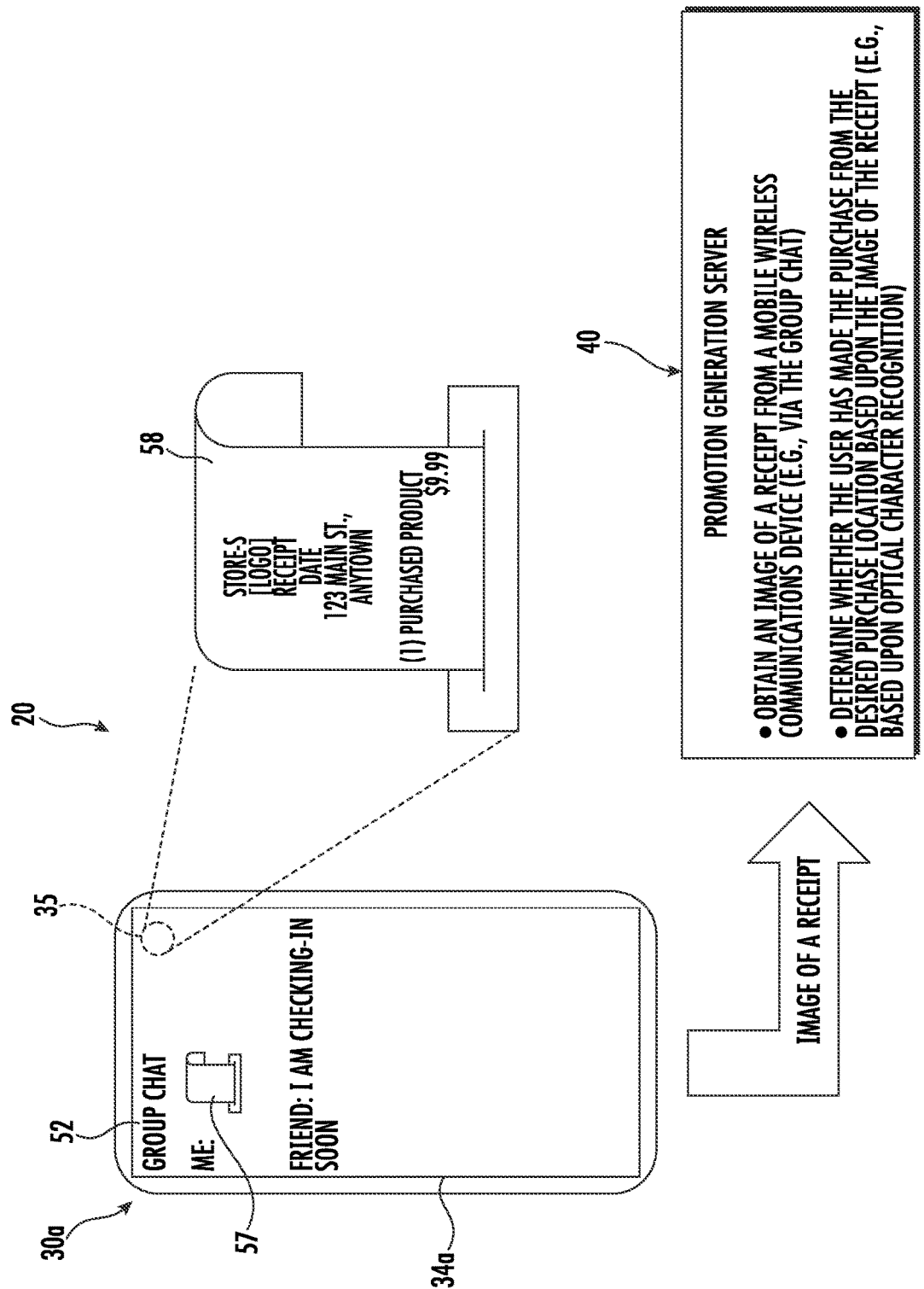
FIG. 3 is another schematic diagram of a system for generating a digital promotion in accordance with an embodiment.

Referring initially to FIGS. 1-3 a system 20 for generating a digital promotion 21 includes mobile wireless communications devices 30a-30n each associated with a respective user. The mobile wireless communications devices are illustratively in the form of a mobile telephone or smartphone. Of course, the mobile wireless communications devices 30a-30n may each be in a different form, for example, a tablet computer, a personal computer, or a wearable device. An exemplary mobile wireless communications device 30a includes a display 34a and a camera 35 (FIG. 3). Each mobile wireless communications device 30a-30n may include other components or devices, for example, input devices.

The system 20 also includes a promotion generation server 40. The promotion generation server 40 includes a processor 41 and an associated memory 42. While operations of the promotion generation server 40 are described herein, the operations are performed based upon cooperation between the processor 41 and memory 42 as will be appreciated by those skilled in the art.

Figure 4:
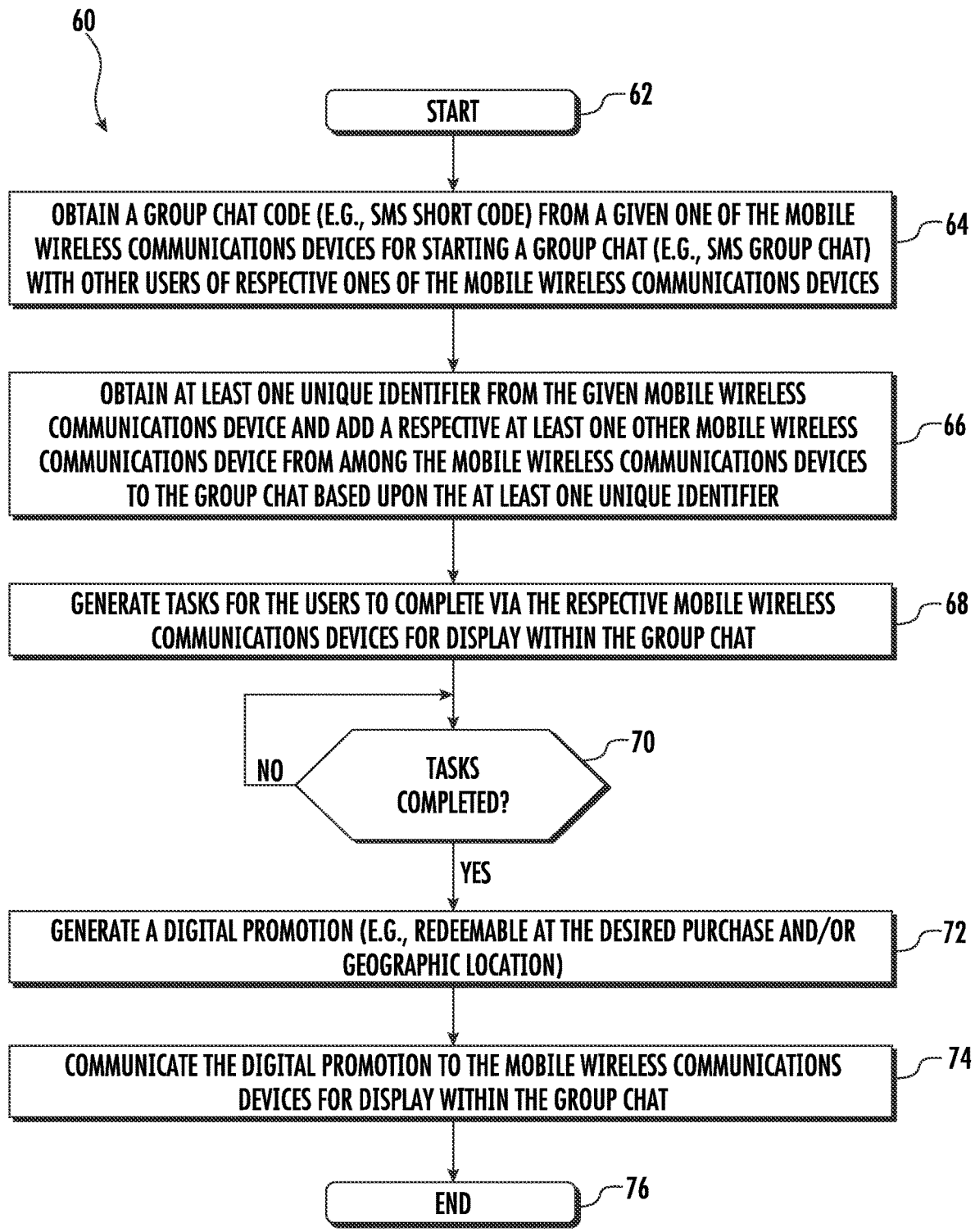
FIG. 4 is a flow diagram illustrating operation of a promotion generation server of a system for generating a digital promotion in accordance with an embodiment.

Referring now to the flowchart 60 in FIG. 4, beginning at Block 62, operations of the promotion generation server will now be described. At Block 64, the promotion generation server obtains a group chat code 51 from a given mobile wireless communications device 30a for starting a group chat 52 with other users of respective mobile wireless communications devices 30b-30n. The group chat code 51 may be entered, for example, manually, via an input device of the given mobile wireless communications device 30a to a messenger or communications application. As will be appreciated by those skilled in the art, by providing and entering the group chat code 51, the user associated with the given mobile wireless communications device 30a is initiating the group chat 52 by conceptually, for example, opening the group chat with and identified by the group chat code 51.

The group chat 52 may be a short messaging service (SMS) group chat, and thus, the group chat code 51 may be in the form of an SMS short code, for example. The group chat 52 may be another type of group chat, for example, social media messenger, instant messenger, etc. Accordingly, the group chat code 51 may be other type of code, for example, to identify a particular group chat 52. The group chat code 51 may be provided by a brand or manufacturer associated with a product for purchase, for example. The group chat code 51 may be provided by a retailer or service provider. The promotion generation server 40 may provide a chatbot or other bot within the group chat 52, for example, to provide instructions, notifications, etc., as will be explained in further detail below.

The promotion generation server 40, at Block 66, obtains a unique identifier 53 from the given mobile wireless communications device 30a. The unique identifier 53 may be a phone number, for example, associated with another mobile wireless communications device 30b-30n. The unique identifier 53 may be another unique identifier, for example, social media username, email address, or other identifier to identify a respective user and associated mobile wireless communications device 30b-30n.

The unique identifier 53 may be provided as input to the given mobile wireless communications device 30a, for example, manually via a touch input or other input device, and communicated wirelessly to the promotion generation server 40. For each provided or obtained unique identifier, the promotion generation server 40 adds a respective mobile wireless communications device 30b-30n to the group chat 52 based upon the at least one unique identifier. For example, a notification or invitation to the join the group chat 52 may be communicated to the wireless communications devices associated with each unique identifier 53, which may be accepted by respective users. In some embodiments, a notification may not be sent that prompts for acceptance, but rather, access to the group chat 52 may be provided or the mobile wireless communications device added based upon obtaining the unique identifier.

At Block 68, the promotion generation server 40 generates tasks 55a, 55b for users to complete via the respective mobile wireless communications devices 30a-30n for display within the group chat 52. More particularly, the promotion generation server 40 generates a number of tasks 55a, 55b for completion, which are communicated via the group chat 52 to each user (i.e., displayed on each mobile wireless communications device 30a-30n).

An exemplary task may include one of the users checking-in at a desired geographic location 56 (FIG. 2). For example, a given user may check-in at a restaurant, park, or other location. In other words, for the given user to complete the task, the given user checks-in at the desired geographic location 56 with the corresponding mobile wireless communications device 30b.

To determine whether the task has been completed, the promotion generation server 40 obtains an actual geographic location from the respective mobile wireless communications device 30b and compares the actual geographic location to the desired geographic location 56. When there is a match between the actual and desired geographic locations, the task may be considered complete. In some embodiments, input, for example, manual input indicative of a check-in may initiate or be used in conjunction with the match determination between the desired and actual geographic locations. The geographic locations may include geographic coordinates, for example, and thus a match may be considered when the actual and desired coordinates are within a threshold distance from one another. Alternatively or additionally, the geographic locations may be a street address, and a match may be considered when the street addresses of the desired and actual locations match.

The mobile device 30b associated with the given user checking-in may communicate the actual geographic location of the mobile wireless communications device based upon a global positioning system (GPS) receiver, network address or identifier (e.g., communicating via the WiFi network at the desired geographic location), or other location identifier, which may be communicated to the promotion generation server 40. In an embodiment, the promotion generation server 40 may obtain the actual geographic location of the mobile wireless communications device 30b based upon triangulation, for example. Other and/or additional techniques may be used to determine the actual location of the mobile wireless communications devices 30a-30n.

In some embodiments, each mobile wireless communications device 30a-30n may push its actual geographic location at a desired frequency based upon the group chat 52. In other words, so long as the group chat 52 is open, in-progress, or established, the mobile wireless communications device 30a-30n may communicate, in the background to the application operating the group chat, its associated actual geographic location. A notification of completion of the task may be communicated within the group chat 52.

Another exemplary embodiment may include making a purchase at a desired purchase location (FIG. 3). To determine whether a given user has completed a purchase at the desired purchase location, the given user may scan or acquire an image 57 of a receipt 58 or guest check from the desired purchase location. More particularly, the promotion generation server 40 may obtain an image 57 of a receipt 58 or guest check from a mobile wireless communications device 30a. The image 57 of the receipt 58 or guest check may be obtained based upon a corresponding camera 35 of the mobile wireless communications device 30a. The mobile wireless communications device 30a may wirelessly communicate the image 57 of the receipt 58 or guest check to the promotion generation server 40. The image 57 of the receipt 58 or guest check may be communicated via the group chat 52. This may advantageously indicate to the other users that the current task has been completed.

The promotion generation server 40 determines whether the user has made or completed the purchase or task from the desired purchase location based upon the image 57 of the receipt 58 or guest check. The promotion generation server 40 may perform an optical character recognition of the image 57 of the receipt 58 or guest check to identify certain terms, words, phrases, dates, logos, formats, etc. For example, a given receipt 58 from a desired purchase location may have a corresponding logo, phone number, and address printed on the receipt or guest check. Using the optical character recognition, the promotion generation server 40 may identify and compare the recognized portions of the image 57 to a reference image stored in the memory 42 and associated with the desired purchase location.

In an embodiment, upon completing a purchase at the desired purchase location, a point-of-sale (POS) terminal at the desired purchase location may communicate a digital copy of the receipt or information normally included within the receipt or guest check (e.g., desired purchase location name, data, telephone number, items purchased, etc.) to the promotion generation server 40. The unique identifier associated with the mobile wireless communications device 30a-30n may also be communicated, for example, from the POS terminal, to the promotion generation server 40 to identify the user or mobile wireless communications device for determining whether the task of making a purchase at a desired purchase location has been completed.

As will be appreciated by those skilled the art, any given user may complete one or more of the generated tasks 55a, 55b. There may be any number of tasks 55a, 55b.

The promotion generation server 40 determines when each of the tasks has been completed based upon input from one or more of the mobile wireless communications devices 30a-30n (Block 70). The promotion generation server 40 may determine when each task has been completed as described above.

When each of the tasks has been completed (Block 70), the promotion generation server 40 generates a digital promotion 50 (Block 72). The digital promotion 50 may be a digital coupon or digital rebate, for example. The digital promotion 50 is communicated, for example, at Block 74, to each of the mobile wireless communications devices 30a-30n so that it is displayed within the group chat 52. In embodiments where one of the tasks to be completed is checking-in at a desired location, the digital promotion 50 may be redeemable at the desired geographic location. Similarly, where one of the tasks is making a purchase at a desired a purchase location, the digital promotion 50 may be redeemable at the desired purchase location.

The promotion generation server 40 polls for a response or for completion of the tasks. However, in some embodiments, the promotion generation server 40 may poll for a threshold time period, for example, depending on the amount and type of tasks to be performed, for completion of the tasks. If the tasks are not completed within the threshold time period, operations end at Block 76.

The digital promotion 50 may be redeemable by each of the users within the group chat 52. In other words, while one or two users have completed the tasks, if there are five users in the group chat 52, each of the five users may redeem the digital promotion 50.

In some embodiments, the promotion generation server 40 may generate tasks for each respective user to complete via their respective mobile wireless communications devices 30a-30n. When a task has been generated for each respective user (and assigned), the promotion generation server 40 determines when each user has completed their respective tasks (as opposed to one or more users, or a subset of users, completing the tasks). When all the users have completed their respective tasks, the promotion generation server 40 generates and communicates the digital promotion 50. Operations end at Block 76.

A method aspect is directed to a method of generating a digital promotion 50. The method includes using a promotion generation server 40 to obtain a group chat code 51 from a given one of a plurality of mobile wireless communications devices 30a-30n each associated with a respective user for starting a group chat 52 with other users of respective ones of the plurality of mobile wireless communications devices. The method also includes using the promotion generation server 40 to obtain at least one unique identifier 53 from the given mobile wireless communications device 30a and add a respective at least one other mobile wireless communications device 30b-30n from among the plurality thereof to the group chat 52 based upon the at least one unique identifier, and generate a plurality of tasks 55a, 55b for the plurality of users to complete via the respective mobile wireless communications devices for display within the group chat.

The method further includes using the promotion generation server 40 to determine when each of the plurality of tasks 55a, 55b has been completed based upon input from at least one of the plurality of mobile wireless communications devices 30a-30n, and when so generate and communicate the digital promotion 50 to the plurality of mobile wireless communications devices for display within the group chat 52.

A computer readable medium aspect is directed to a non-transitory computer readable medium for generating a digital promotion 50. The non-transitory computer readable medium has computer executable instructions that when executed by a processor 41 cause the processor to perform operations. The operations include obtaining a group chat code 51 from a given one of a plurality of mobile wireless communications devices 30a-30n each associated with a respective user for starting a group chat 52 with other users of respective ones of the plurality of mobile wireless communications devices.

The operations also include obtaining at least one unique identifier 53 from the given mobile wireless communications device 30a and add a respective at least one other mobile wireless communications device 30b-30n from among the plurality thereof to the group chat 52 based upon the at least one unique identifier. The operations further include generating a plurality of tasks 55a, 55b for the plurality of users to complete via the respective mobile wireless communications devices 30a-30n for display within the group chat 52. The operations also include determining when each of the plurality of tasks 55a, 55b has been completed based upon input from at least one of the plurality of mobile wireless communications devices 30a-30n, and when so generating and communicating the digital promotion 50 to the plurality of mobile wireless communications devices for display within the group chat 52.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for generating a digital coupon redeemable toward a purchase comprising:
a plurality of mobile wireless communications devices each associated with a respective user; and
a promotion generation server configured to obtain a group chat code from a given one of the plurality of mobile wireless communications devices, the group chat code for starting a group chat with other users of respective ones of the plurality of mobile wireless communications devices,
start the group chat with the given one of the plurality of mobile wireless communications devices based upon the group chat code, the group chat permitting the respective user and the other users to communicate so that communications of any user can be seen by the other users,
obtain, in the group chat, at least one unique identifier from the given mobile wireless communications device, the at least one unique identifier being associated with at least one respective other mobile wireless communications device,
communicate with the respective at least one mobile wireless communications device based upon the associated at least one unique identifier,
add the respective at least one other mobile wireless communications device from among the plurality thereof to the group chat based upon the communication therewith,
operate a chatbot within the group chat so that chatbot communications are viewed by the respective user and the other users, the chatbot being operated to
generate a plurality of tasks for the plurality of users to complete via the respective mobile wireless communications devices for display within the group chat, and
determine when each of the plurality of tasks has been completed based upon input from at least one of the plurality of mobile wireless communications devices, and when so generate and communicate the digital coupon to the plurality of mobile wireless communications devices, via the chatbot, for display within the group chat.

2. The system of claim 1 wherein the plurality of tasks comprises one of the plurality of users checking-in at a desired geographic location; and wherein the promotion generation server is configured to obtain an actual geographic location from at least one of the plurality of mobile wireless communications devices and determine whether the user has checked-in at the geographic location based upon a match between the desired and actual geographic locations.

3. The system of claim 1 wherein the plurality of tasks comprises making a purchase at a desired purchase location; and wherein the promotion generation server is configured to obtain an image of a receipt from at least one of the mobile wireless communications devices, and determine whether the user has made the purchase from the desired purchase location based upon the image of the receipt.

4. The system of claim 3 wherein the promotion generation server is configured to perform an optical character recognition of the image of the receipt, and determine whether the user has made the purchase based upon the optical character recognition.

5. The system of claim 3 wherein the promotion generation server is configured to obtain the image of the receipt via the group chat.

6. The system of claim 3 wherein the digital coupon is redeemable at the desired purchase location.

7. The system of claim 1 wherein the promotion generation server is configured to generate the plurality of tasks for each respective user to complete via the respective mobile wireless communications device, and determine when each of the respective users has completed the plurality of tasks based upon input from respective ones of the plurality of mobile wireless communications devices.

8. The system of claim 1 wherein the digital coupon is redeemable by each of the respective users within the group chat.

9. The system of claim 1 wherein the group chat comprises a short message service (SMS) group chat; and wherein the chat code comprises an SMS short code.

10. A promotion generation server comprising:
a processor and an associated memory configured to
obtain a group chat code from a given one of a plurality of mobile wireless communications devices each associated with a respective user, the group chat code for starting a group chat with other users of respective ones of the plurality of mobile wireless communications devices,
start the group chat with the given one of the plurality of mobile wireless communications devices based upon the group chat code, the group chat permitting the respective user and the other users to communicate so that communications of any user can be seen by the other users,
obtain, in the group chat, at least one unique identifier from the given mobile wireless communications device, the at least one unique identifier being associated with at least one respective other mobile wireless communications device,
communicate with the respective at least one mobile wireless communications device based upon the associated at least one unique identifier,
add the respective at least one other mobile wireless communications device from among the plurality thereof to the group chat based upon the communication therewith,
operate a chatbot within the group chat so that chatbot communications are viewed by the respective user and the other users, the chatbot being operated, to
generate a plurality of tasks for the plurality of users to complete via the respective mobile wireless communications devices for display within the group chat, and
determine when each of the plurality of tasks has been completed based upon input from at least one of the plurality of mobile wireless communications devices, and when so generate and communicate a digital coupon redeemable toward a purchase to the plurality of mobile wireless communications devices, via the chatbot, for display within the group chat.

11. The promotion generation server of claim 10 wherein the plurality of tasks comprises one of the plurality of users checking-in at a desired geographic location; and wherein the processor is configured to obtain an actual geographic location from at least one of the plurality of mobile wireless communications devices and determine whether the user has checked-in at the geographic location based upon a match between the desired and actual geographic locations.

12. The promotion generation server of claim 10 wherein the plurality of tasks comprises making a purchase at a desired purchase location; and wherein the processor is configured to obtain an image of a receipt from at least one of the mobile wireless communications devices, and determine whether the user has made the purchase from the desired purchase location based upon the image of the receipt.

13. The promotion generation server of claim 12 wherein the processor is configured to perform an optical character recognition of the image of the receipt, and determine whether the user has made the purchase based upon the optical character recognition.

14. The promotion generation server of claim 12 wherein the processor is configured to obtain the image of the receipt via the group chat.

15. The promotion generation server of claim 12 wherein the digital coupon is redeemable at the desired purchase location.

16. The promotion generation server of claim 10 wherein the processor is configured to generate the plurality of tasks for each respective user to complete via the respective mobile wireless communications device, and determine when each of the respective users has completed the plurality of tasks based upon input from respective ones of the plurality of mobile wireless communications devices.

17. A method of generating a digital coupon redeemable toward a purchase, the method comprising:
using a promotion generation server to
obtain a group chat code from a given one of a plurality of mobile wireless communications devices each associated with a respective user, the group chat code for starting a group chat with other users of respective ones of the plurality of mobile wireless communications devices,
start the group chat with the given one of the plurality of mobile wireless communications devices based upon the group chat code, the group chat permitting the respective user and the other users to communicate so that communications of any user can be seen by the other users,
obtain, in the group chat, at least one unique identifier from the given mobile wireless communications device, the at least one unique identifier being associated with at least one respective other mobile wireless communications device,
communicate with the respective at least one mobile wireless communications device based upon the associated at least one unique identifier,
add the respective at least one other mobile wireless communications device from among the plurality thereof to the group chat based upon the communication therewith,
operate a chatbot within the group chat so that chatbot communications are viewed by the respective user and the other users, the chatbot being operated to
generate a plurality of tasks for the plurality of users to complete via the respective mobile wireless communications devices for display within the group chat, and
determine when each of the plurality of tasks has been completed based upon input from at least one of the plurality of mobile wireless communications devices, and when so generate and communicate the digital coupon to the plurality of mobile wireless communications devices, via the chatbot, for display within the group chat.

18. The method of claim 17 wherein the plurality of tasks comprises one of the plurality of users checking-in at a desired geographic location; and wherein using the promotion generation server comprises using the promotion generation server to obtain an actual geographic location from at least one of the plurality of mobile wireless communications devices and determine whether the user has checked-in at the geographic location based upon a match between the desired and actual geographic locations.

19. The method of claim 17 wherein the plurality of tasks comprises making a purchase at a desired purchase location; and wherein using the promotion generation server comprises using the promotion generation server to obtain an image of a receipt from at least one of the mobile wireless communications devices, and determine whether the user has made the purchase from the desired purchase location based upon the image of the receipt.

20. The method of claim 17 wherein using the promotion generation server comprises using the promotion generation server to generate the plurality of tasks for each respective user to complete via the respective mobile wireless communications device, and determine when each of the respective users has completed the plurality of tasks based upon input from respective ones of the plurality of mobile wireless communications devices.

21. A non-transitory computer readable medium for generating a digital coupon redeemable toward a purchase, the non-transitory computer readable medium having computer executable instructions that when executed by a processor cause the processor to perform operations comprising:
 obtaining a group chat code from a given one of a plurality of mobile wireless communications devices each associated with a respective user, the group chat code for starting a group chat with other users of respective ones of the plurality of mobile wireless communications devices;
 starting the group chat with the given one of the plurality of mobile wireless communications devices based upon the group chat code, the group chat permitting the respective user and the other users to communicate so that communications of any user can be seen by the other users;
 obtaining, in the group chat, at least one unique identifier from the given mobile wireless communications device, the at least one unique identifier being associated with at least one respective other mobile wireless communications device;
 communicating with the respective at least one mobile wireless communications device based upon the associated at least one unique identifier;
 adding a respective at least one other mobile wireless communications device from among the plurality thereof to the group chat based upon the communication therewith;
 operating a chatbot within the chat group so that chatbot communications are viewed by the respective user and the other users, the chatbot being operated to
  generate a plurality of tasks for the plurality of users to complete via the respective mobile wireless communications devices for display within the group chat, and
  determine when each of the plurality of tasks has been completed based upon input from at least one of the plurality of mobile wireless communications devices, and when so generating and communicating the digital coupon to the plurality of mobile wireless communications devices, via the chatbot, for display within the group chat.

22. The non-transitory computer readable medium of claim 21 wherein the plurality of tasks comprises one of the plurality of users checking-in at a desired geographic location; and wherein the operations comprise obtaining an actual geographic location from at least one of the plurality of mobile wireless communications devices and determining whether the user has checked-in at the geographic location based upon a match between the desired and actual geographic locations.

23. The non-transitory computer readable medium of claim 21 wherein the plurality of tasks comprises making a purchase at a desired purchase location; and wherein the operations comprise obtaining an image of a receipt from at least one of the mobile wireless communications devices, and determining whether the user has made the purchase from the desired purchase location based upon the image of the receipt.

24. The non-transitory computer readable medium of claim 21 wherein the operations comprise generating the plurality of tasks for each respective user to complete via the respective mobile wireless communications device, and determining when each of the respective users has completed the plurality of tasks based upon input from respective ones of the plurality of mobile wireless communications devices.

* * * * *